United States Patent
Matsunaga

(10) Patent No.: US 8,531,554 B2
(45) Date of Patent: Sep. 10, 2013

(54) IMAGE CAPTURING APPARATUS, IMAGE CAPTURING METHOD, AND STORAGE MEDIUM STORING PROGRAM FOR IMAGE CAPTURING

(75) Inventor: Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 59 days.

(21) Appl. No.: 13/295,296

(22) Filed: Nov. 14, 2011

(65) Prior Publication Data

US 2012/0127345 A1     May 24, 2012

(30) Foreign Application Priority Data

Nov. 18, 2010    (JP) ................................. 2010-257662

(51) Int. Cl.
*H04N 5/76* (2006.01)
*H04N 5/235* (2006.01)
*H04N 5/238* (2006.01)

(52) U.S. Cl.
USPC ...... 348/231.99; 348/362; 348/363; 348/364; 348/365

(58) Field of Classification Search
None
See application file for complete search history.

(56) References Cited

U.S. PATENT DOCUMENTS

| 7,889,983 B2 | 2/2011 | Otsuka | |
|---|---|---|---|
| 7,929,047 B2 | 4/2011 | Endo | |
| 2010/0277609 A1* | 11/2010 | Abe | 348/222.1 |
| 2010/0295962 A1* | 11/2010 | Terauchi | 348/222.1 |
| 2011/0279693 A1* | 11/2011 | Hamada | 348/208.4 |
| 2012/0177352 A1* | 7/2012 | Pillman et al. | 396/61 |

FOREIGN PATENT DOCUMENTS

| JP | 2004-214836 A | 7/2004 |
|---|---|---|
| JP | 2005-204185 A | 7/2005 |
| JP | 2007-288235 A | 11/2007 |
| JP | 2008-199518 A | 8/2008 |
| JP | 2009-017006 A | 1/2009 |
| JP | 2010-114566 A | 5/2010 |
| KR | 2009-0033045 A | 4/2009 |

OTHER PUBLICATIONS

Korean Office Action dated Sep. 11, 2012 (and English translation thereof) in counterpart Korean Application No. 10-2011-0120491.

* cited by examiner

*Primary Examiner* — Lin Ye
*Assistant Examiner* — John H Morehead, III
(74) *Attorney, Agent, or Firm* — Holtz, Holtz, Goodman & Chick, PC

(57) ABSTRACT

There is provided an image capturing method for use in an image capturing apparatus including an image capturing unit configured to capture an image of an object to output image data. The method includes performing a first position adjustment between the image data obtained under the first image capturing control and the image data obtained under the second image capturing control, thereby calculating a first displacement, performing a second position adjustment between the image data obtained under the second image capturing control and the image data obtained under the third image capturing control, thereby calculating a second displacement, and performing an image composition of obtaining image data representing a composite image, by performing a position adjustment between the image data obtained under the first image capturing control and the image data obtained under the third image capturing control, using the first and second displacements.

11 Claims, 5 Drawing Sheets

IMAGE CAPTURING APPARATUS, IMAGE CAPTURING METHOD, AND STORAGE MEDIUM STORING PROGRAM FOR IMAGE CAPTURING

CROSS-REFERENCE TO RELATED APPLICATIONS

This application is based upon and claims the benefit of priority from prior Japanese Patent Application No. 2010-257662, filed Nov. 18, 2010, the entire contents of which are incorporated herein by reference.

BACKGROUND OF THE INVENTION

1. Field of the Invention

The present invention relates to an image capturing apparatus, an image capturing method and a storage medium storing a program for image capturing, suitable for use in, for example, digital cameras having a scene programming function.

2. Description of the Related Art

Many digital cameras have a scene programming function of first specifying a composition desirable for the object, a light-source environment, an image capturing pattern and the like, and then automatically setting any desirable image capturing mode.

One of the image capturing modes where the scene programming function can set is known as "night-scene/person" mode. In this image capturing mode, the object field depth is first set to a high value, and an image of a person is captured with a night scene as background, while illuminated with auxiliary light in an appropriate amount.

So-called "multi-exposure" image capturing is proposed (see, for example, Jpn. Pat. Appln. KOKAI Publication No, 2010-114566). In the multi-exposure image capturing, an image of an object in the foreground is first captured in the "night-scene/person" mode, while illuminated with auxiliary light. Next, an image of the object is continuously captured several times, while illuminated with no auxiliary light. Further, these images are corrected on the basis of the displacement between their characteristic points, and then combined to form a composite image. Finally, the composite image is further combined with the image of the object captured in the foreground to form a composite image.

The composite image thus formed is "a little dark" as a whole, because the shutter has been released several times and, therefore, for a long time. By contrast, an image obtained before the continuous image capturing is "very bright" in the foreground only and "very dark" in the background.

Consequently, the composite image obtained by the continuous image capturing greatly differs from the image obtained before the continuous image capturing, in luminance of not only the background but also the person in the foreground. Hence, it is difficult to perform a position adjustment between these images.

BRIEF SUMMARY OF THE INVENTION

According to one aspect of the present invention, there is provided an image capturing apparatus comprising: an image capturing unit configured to capture an image of an object to output image data; a flash unit configured to apply light to the object when the image capturing unit captures an image of the object; a holding unit configured to hold the image data output by the image capturing unit; a first image capturing control unit configured to cause the image capturing unit to capture an image of the object at a predetermined shutter speed, while the flash unit is applying no light; a second image capturing control unit configured to cause the image capturing unit to capture an image of the object at a shutter speed higher than the predetermined shutter speed, while the flash unit is applying no light; a third image capturing control unit configured to cause the image capturing unit to capture an image of the object at a shutter speed higher than the predetermined shutter speed, while the flash unit is applying light; a first position adjusting unit configured to perform a position adjustment between the image data obtained under the control of the first image capturing control unit and held in the holding unit, and the image data obtained under the control of the second image capturing control unit and held in the holding unit, thereby calculating a first displacement; a second position adjusting unit configured to perform a position adjustment between the image data obtained under the control of the second image capturing control unit and held in the holding unit, and the image data obtained under the control of the third image capturing control unit and held in the holding unit, thereby calculating a second displacement; an image composing unit configured to obtain image data representing a composite image, by performing a position adjustment between the image data obtained under the control of the first image capturing control unit and held in the holding unit, and the image data obtained under the control of the third image capturing control unit and held in the holding unit, using the first and second displacements; and a saving unit configured to save, in a medium, the image data obtained by the image composing unit.

According to another aspect of the present invention, there is provided an image capturing method for use in an image capturing apparatus including an image capturing unit configured to capture an image of an object to output image data, a flash unit configured to apply light to the object when the image capturing unit captures an image of the object, and a holding unit configured to hold the image data output by the image capturing unit, the method comprising: performing a first image capturing control of causing the image capturing unit to capture an image of the object at a predetermined shutter speed, while the flash unit is applying no light; performing a second image capturing control of causing the image capturing unit to capture an image of the object at a shutter speed higher than the predetermined shutter speed, while the flash unit is applying no light; performing a third image capturing control of causing the image capturing unit to capture an image of the object at a shutter speed higher than the predetermined shutter speed, while the flash unit is applying light; performing a first position adjustment between the image data obtained under the first image capturing control and held in the holding unit, and the image data obtained under the second image capturing control and held in the holding unit, thereby calculating a first displacement; performing a second position adjustment between the image data obtained under the second image capturing control and held in the holding unit, and the image data obtained under the third image capturing control and held in the holding unit, thereby calculating a second displacement; and performing an image composition of obtaining image data representing a composite image, by performing a position adjustment between the image data obtained under the first image capturing control and held in the holding unit, and the image data obtained under the third image capturing control and held in the holding unit, using the first and second displacements.

According to still another aspect of the present invention, there is provided a non-transitory information storage medium storing computer-executable program code for a computer serving as an image capturing apparatus including an image capturing unit configured to capture an image of an object to output image data, a flash unit configured to apply light to the object when the image capturing unit captures an image of the object, and a holding unit configured to hold the image data output by the image capturing unit, the program code comprising: performing a first image capturing control of causing the image capturing unit to capture an image of the object at a predetermined shutter speed, while the flash unit is applying no light; performing a second image capturing control of causing the image capturing unit to capture an image of the object at a shutter speed higher than the predetermined shutter speed, while the flash unit is applying no light; performing a third image capturing control of causing the image capturing unit to capture an image of the object at a shutter speed higher than the predetermined shutter speed, while the flash unit is applying light; performing a first position adjustment between the image data obtained under the first image capturing control and held in the holding unit, and the image data obtained under the second image capturing control and held in the holding unit, thereby calculating a first displacement; performing a second position adjustment between the image data obtained under the second image capturing control and held in the holding unit, and the image data obtained under the third image capturing control and held in the holding unit, thereby calculating a second displacement; and performing an image composition of obtaining image data representing a composite image, by performing a position adjustment between the image data obtained under the first image capturing control and held in the holding unit, and the image data obtained under the third image capturing control and held in the holding unit, using the first and second displacements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention, which is realized as a digital camera, will be described with reference to the accompanying drawings.

Figure 1:
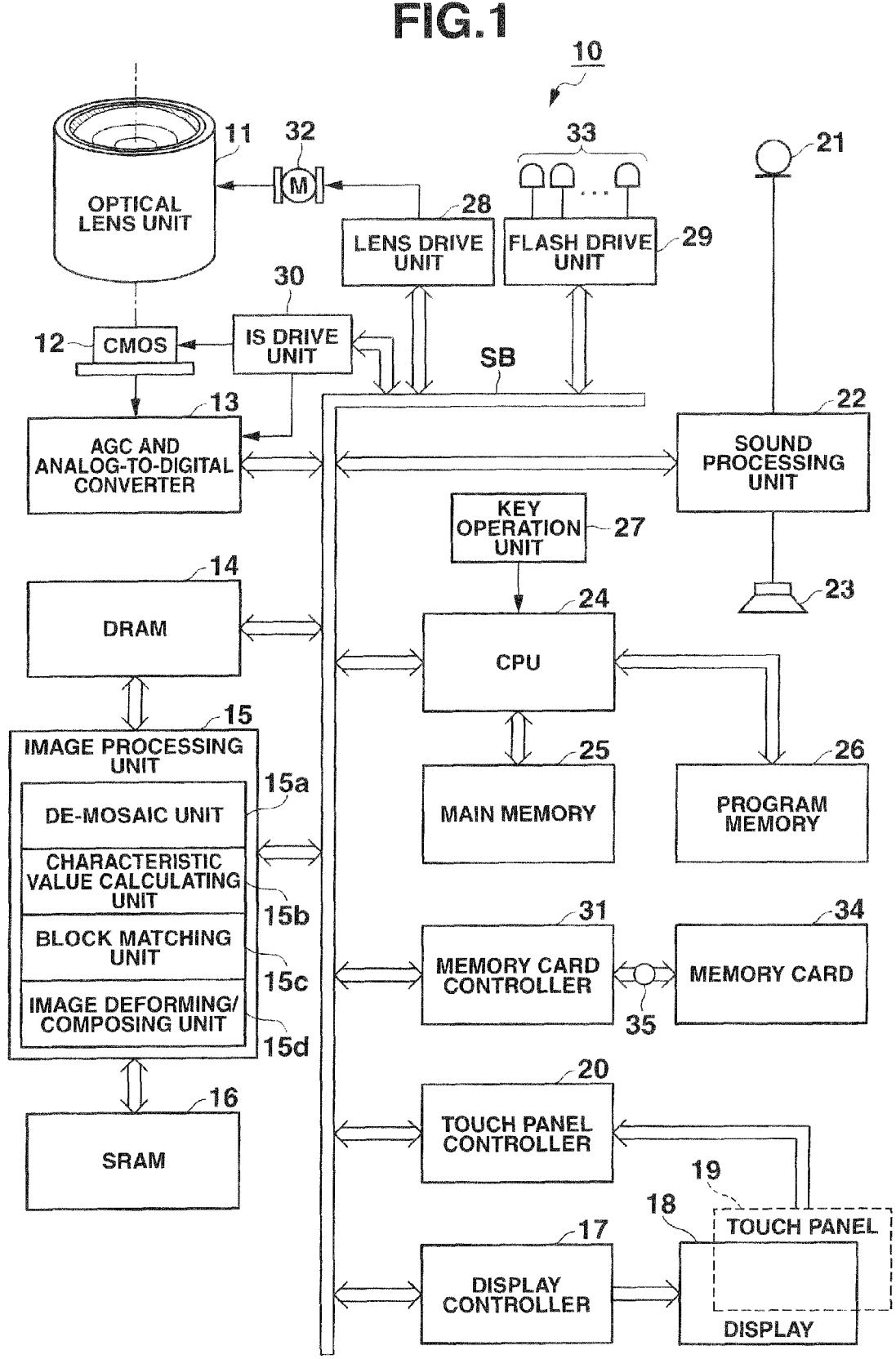
FIG. 1 is a block diagram showing the circuit configuration of a digital camera according to one embodiment of the present invention.

FIG. 1 shows the circuit configuration a digital camera 10 according to one embodiment of the invention. As shown in FIG. 1, light is applied through the optical lens unit 11 arranged in the front part of the camera body to, for example, a sensing surface of a CMOS image sensor 12 to form an optical image of an object.

In a monitored state known as "through image display" or "live-view image display," the image signal obtained by the CMOS image sensor 12 is supplied to an AGC & analog-to-digital converter 13. The AGC & analog-to-digital converter 13 performs correlated square sampling, automatic gain adjustment and analog-to-digital (A/D) conversion on the image signal, generating digital image data. The digital image data is supplied via a system bus SB to a DRAM 14. The DRAM 14, which is a buffer memory, holds the digital image data.

An image processing unit 15 properly performs necessary image processing for the image data held in the DRAM 14. The image processing unit 15 includes a de-mosaic unit 15a, a characteristic value calculating unit 15b, a block matching unit 15c, and an image deforming/composing unit 15d. To the image processing unit 15, a SRAM 16 is connected. The SRAM 16 is used mainly in the image matching process the block matching unit 15c performs.

In the image processing unit 15, matrix calculation, pixel interpolation, gamma correction, etc. are performed, in a de-mosaic fashion, on the image data (hereinafter referred to as "RAW data") that accords with the configuration of the color filter of the Bayer arrangement, provided in the CMOS image sensor 12. A digital development process is then performed on the image data, converting the data to image data of a luminance-chrominance system (YUV).

The image processing unit 15 processes the image data, generating image data in which the number of pixels and gradation bits are greatly reduced. The image data obtained is supplied through the system bus SB to a display controller 17. The display controller 17 drives a display 18 in accordance with the image data supplied from the image processing unit 15. The display 18 displays a through image represented by the image data supplied from the display controller 17.

The display 18 is constituted by, for example, a color liquid crystal panel having a backlight. A touch panel 19 is formed with the upper part of the display 18 and has a transparent conductive film. When a user touches the touch panel 19 with, for example, a finger, a touch panel controller 20 calculates a coordinate position where the user has touched the touch panel 19. A signal representing the coordinate position is supplied via the system bus SB to a CPU 24, which will be described later.

Like the optical lens unit 11, a microphone 21 is arranged in the front part of the camera body. The microphone 21 picks up the sound coming in the direction of the object. The microphone 21 changes the sound into an electric signal. The electric signal is output to a sound processing unit 22.

The sound processing unit 22 receives the sound signal from the microphone 21 and converts the signal to digital audio data, when sound only, a still image with sound, or a moving image with sound is captured. The sound processing unit 22 then detects the sound-pressure level of the digital audio data and compresses the digital audio data in a predetermined data file format, such as advanced audio coding (ARC) of the Moving Picture Experts Group-4 (MPEG-4) system, generating an audio data file. The audio data file, thus generated, is sent to a storage medium, which will be described later.

The sound processing unit 22 has a sound source such as PCM sound source, and decompresses the audio data file input to reproduce the sound, and converts the same to analog audio data. The analog audio data is supplied to a speaker 23 provided at the back of the digital camera 10. The speaker 23 generates the sound represented by the analog audio data.

The circuits described above are controlled by the CPU 24. The CPU 24 is connected directly to a main memory 25 and a program memory 26. The main memory 25 is, for example, an SRAM, and functions as a work memory. The program memory 26 is, for example, an electrically programmable, nonvolatile memory, such as a flash memory, and permanently stores operating programs and some data. The operating programs include a program for controlling the digital camera 10 in the "night-scene/person" mode of scene programming.

The CPU 24 reads necessary programs and data from the program memory 26, temporarily extends the programs and data in the main memory 25, while it is controlling the other components of the digital camera 10.

The CPU 24 performs control in accordance with the various key operation signals input directly at a key operation unit 27 and a coordinate signal generated as the user touches the touch panel 19 and input from the touch panel controller 20.

The key operation unit 27 has, for example, a power key, a shutter-release key, a zoom up/down key, an image capturing mode key, a playback key, a menu key, cursor-moving keys ("↑," "→," "↓," and "←"), a set key, a release key, and a display key.

The system bus SB connects the CPU 24 to the AGC & analog-to-digital converter 13, DRAM 14, image processing unit 15, display controller 17, touch panel controller 20 and sound processing unit 22. The system bus SB also connects the CPU 24 to a lens drive unit 26, a flash drive unit 29, an image-sensor (IS) drive unit 30, and a memory card controller 31.

The lens drive unit 28 receives a control signal from the CPU 24 and controls a lens drive DC motor (M) 32. Controlled by the lens drive unit 28, the drive DC motor 32 drives part of the lens constituting the optical lens unit 11. More precisely, the drive DC motor moves the zoom lens and the focus lens, independently, along the optical axis of the optical lens unit 11.

The flash drive unit 29 receives a control signal from the CPU 24, when a still image of the object is captured, and then drives a flash unit 33 composed of a plurality of white-emitting, high-luminance LEDs, at the image capturing timing.

The image-sensor drive unit 30 drives the CMOS image sensor 12 in accordance with the image capturing conditions already set, causing the CMOS image sensor 12 to scan the object.

The image processing unit 15 performs a de-mosaic process on the image data supplied from the AGC & analog-to-digital converter 13 and held in the DRAM 14 when an image is captured upon an operation of the shutter-release key at the key operation unit 27. If the image data accords with the predetermined data file format, e.g., Joint Photographic Experts Group (JPEG) format, the image processing unit 15 also performs data compression process, such as discrete cosine transform (DCT) or Huffman coding, on the image data. The image processing unit 15 therefore generates image data file defined by a small amount of data. The image data file, thus generated, is supplied via the memory card controller 31 to a memory card 34 and is recorded therein.

The image processing unit 15 also receives, through the system bus SB, the image data read from the memory card 34 by the memory card controller 31 in a playback mode. The image processing unit 15 first holds the image data in the DRAM 14 and then decompresses the image data held in the DRAM 14, which has been compressed and stored. Thus, the image processing unit 15 generates image data of the initial size. The image data is output through the system bus SB to the display controller 17. The display controller 17 supplies the image data to the display 18. The display 18 displays the image represented by the image data.

The memory card controller 31 is connected by a card connector 35 to the memory card 34. The memory card 34 is removably inserted in the digital camera 10, and is used as a storage medium in the digital camera 10. The memory card 34 incorporates a flash memory, i.e., nonvolatile memory, and a drive circuit configured to drive the flash memory.

An operation according to the embodiment will be explained.

The following operation is carried out after the setting in which the digital camera 10 is set to the "night-scene/person" mode, which is one of the scene programming, under the image capturing mode, and the CPU 24 reads the operating programs from the program memory 26 and the data and then loads the programs and data in the main memory 25.

The program memory 26 stores the operating programs that were written when the digital camera 10 was shipped from the factory. In addition to these operating programs, the program memory 26 stores the operation programs and data downloaded from an external apparatus, e.g., a personal computer, connected to the digital camera 10, in order to achieve a version-up of the digital camera 10.

Figure 2:
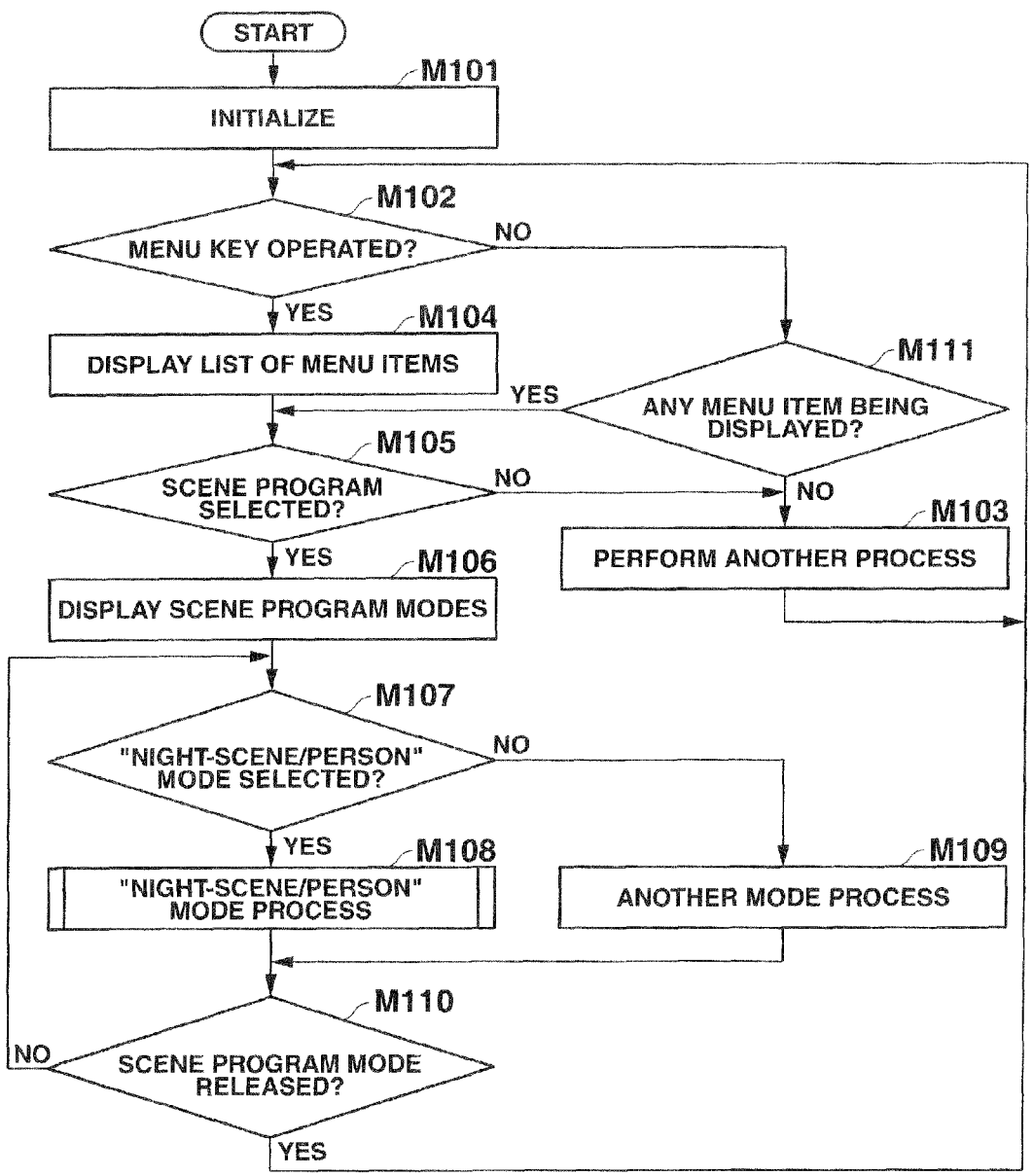
FIG. 2 is a flowchart showing how the digital camera is set to the "night-scene/person" mode according to the embodiment.

FIG. 2 is a flowchart showing how the digital camera is set to the "night-scene/person" mode, which is one of various modes of scene programming, under the image capturing mode, after the power switch of the digital camera 10 is turned on. After the digital camera 10 is turned on, the CPU 24 reads from the program memory 26 various status information items which have been stored when the power switch has been turned off for the last time, and executes setting (Step M101).

Thereafter, the CPU 24 determines whether or not the menu key has been operated at the key operation unit 27 (Step M102). If it is determined that the menu key has not been operated, the CPU 24 determines whether or not any menu item is being displayed (Step M111). If it is determined that no menu items are displayed, another process is performed (Step M103). Then, the operation returns to Step M102.

The CPU 24 waits ready until the user operates the menu key at the key operation unit 27 while performing another process.

If it is determined that the menu key is operated at the key operation unit 27, the CPU 24 determines this event in Step M102. In this case, the CPU 24 causes the display 18 to display a list of various menu items (Step S104). The CPU 24 then determines whether or not the user has selected the scene program that is one of the menu items displayed (Step M105).

If it is determined that any menu item other than the scene program is selected, the CPU 24 performs the process designated by the selected menu item (Step M103).

If it is determined that the scene program is selected as a menu item, the CPU 24 detects this event in Step M105 and causes the display 18 to display the various scene program modes (Step M106). The CPU 24 then determines whether or not the "night-scene/person" mode has been selected (Step M107).

If it is determined that any scene program mode other than the "night-scene/person" has been selected, the CPU 24 performs a process according to the mode selected (Step M109). How this process is performed will not be explained here, nevertheless.

If it is determined in Step M107 that the "night-scene/person" mode has been selected, the CPU 24 processes data in the "night-scene/person" mode (Step M108). Thereafter, the CPU 24 determines whether or not the scene program has been released (Step M110).

If it is determined that the scene program has been released, the operation will return to Step M102. If the scene program lot determined to have been released, the operation will return to Step M107.

Figure 3:
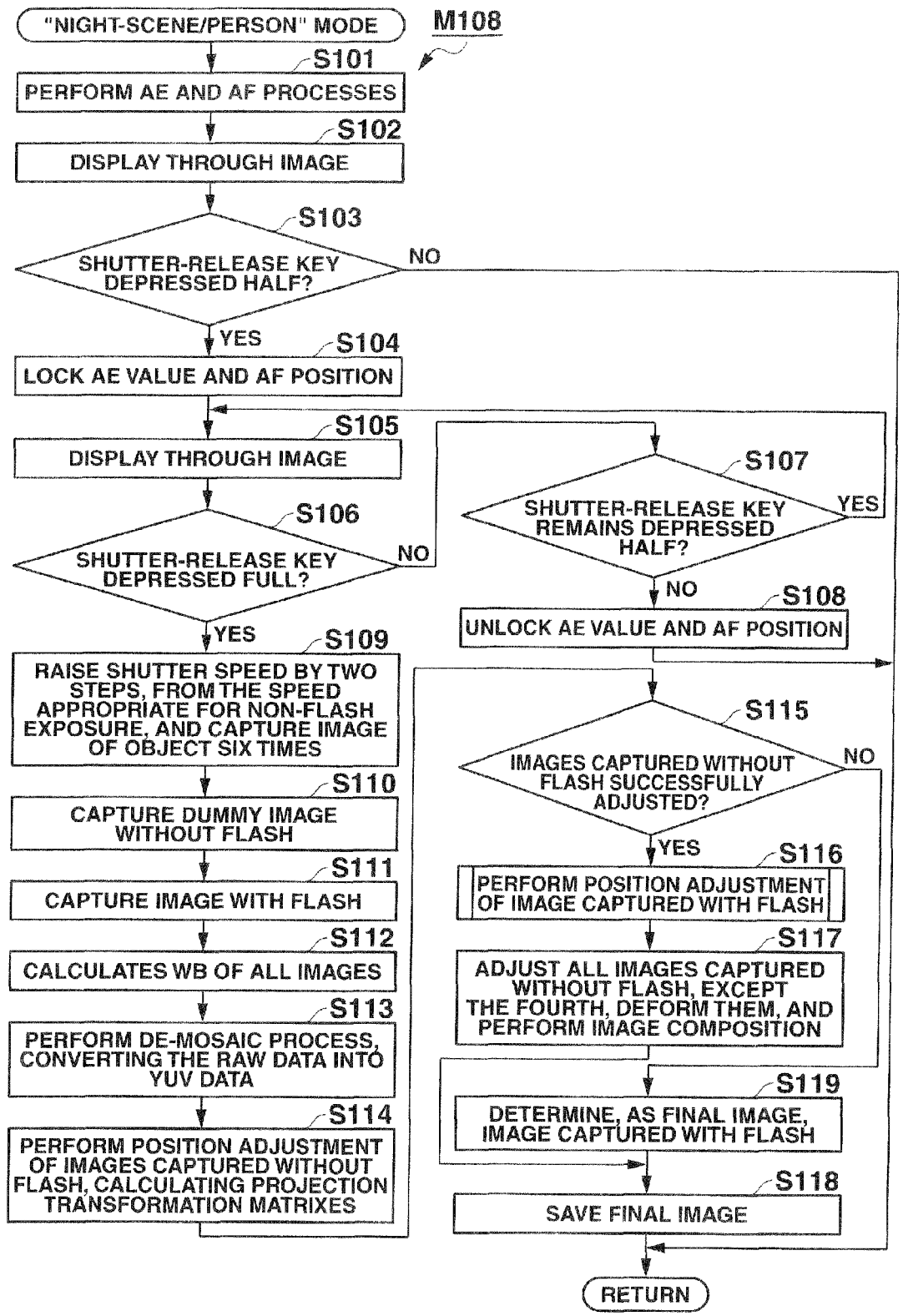
FIG. 3 is a flowchart representing a subroutine of the "night-scene/person" mode shown in FIG. 2.

FIG. 3 shows a subroutine illustrating Step M108 of the "night-scene/person" mode process explained above.

The subroutine is based on the assumption that the shutter-release key of the key operation unit 27 is a two-stroke key. When the shutter-release key is depressed by half the full stroke, or depressed to the first stroke, the automatic exposure (AE) value and automatic focus (AC) position (i.e., position the focus lens has in the optical lens unit 11) are locked. When the shutter-release key is then fully depressed, or depressed to the second stroke, the digital camera 10 captures a still image.

More specifically, in the "night-scene/person" mode, the CPU 24 first performs the AC process and AC process, obtaining an appropriate exposure value and an appropriate focus position. The CPU 21 sets, on the basis of the exposure value obtained, a shutter-lease speed and a diaphragm aperture, both appropriate to the frame rate of a specific through image, such as 30 frames per second, and also controls the position of the focus lens of the optical lens unit 11 on the basis of the focus position obtained (Step S101).

Then, the CPU 24 causes the AGC & analog-to-digital converter 13 to convert the image data sequentially supplied from the CMOS image sensor 12, to digital image data, causes the DRAM 14 to hold the digital image data therein, and causes the de-mosaic unit 15a to perform a de-mosaic process on the image data so as to convert into image data of the primary-color (RGB) system.

The CPU 24 causes the image processing unit 15 to generate, on the basis of the image data after conversion, image data in which the number of pixels and gradation bits are greatly reduced, and supplies the image data through the system bus SB to the display controller 17 to cause a display 18 to display an image (hereinafter "through image") (Step S102).

While the display 18 is displaying the through image, the CPU 24 determines whether or not the shutter-release key has been depressed half at the key operation unit 27 (Step S103). If it is determined that the shutter-release key has not been depressed half, the operation will return to the process of FIG. 2.

As long as the "night-scene/person" mode remains selected, Steps S101 to S103 are repeated. That is, the CPU 24 waits ready until the shutter-release key is depressed half while causing the display 18 to continuously display the through image.

If it is determined that the shutter-release key is depressed half, the CPU 24 detects this event in Step S103. The CPU 24 then locks the AE value and AF position obtained at this point Step S104).

The CPU 24 then causes the display 18 to display the through image on the basis of the image data sequentially supplied from the CMOS image sensor 12 (Step S105).

While the display 18 is displaying the through image, the CPU 24 determines whether or not the shutter-release key has been depressed full at the key operation unit 27 (Step S106). If it is determined that shutter-release key has not been depressed full, the CPU 24 determines whether or not the shutter-release key remains depressed half (Step S107).

If it is determined that the shutter-release key remains depressed half, the operation will return to Step S105.

Steps S105 to S107 are thus repeated. That is, after the AE value and AF position are locked, the waiting of an operation of the shutter-release key depressed lull and the confirmation of an operation of the shutter-release key depressed half are repeated while through image is being displayed.

If it is determined in Step S107 that the shutter-release key has been released from the half-depressed state, the CPU 24 unlocks the AE value and AF position (Step S108). Then, the operation returns to the process of FIG. 2.

If it is determined in Step S106 that the shutter-release key has been depressed full, the CPU 24 sets the shutter speed to a value two steps greater than the value appropriate for the non-flash image capturing exposure (2EV), on the basis of the AE value locked at the time the shutter-release key was depressed full. If the appropriate shutter speed is "1/15 [sec]," the CPU 24 sets the speed to "1/60 [sec]. Then, the digital camera 10 continuously captures an image of the object, for example, six times (Step S109).

The six still images obtained at this point are underexposed, at an exposure value less than the appropriate value by 2EV. Nonetheless, the still images are hardly blurred in hand movement or object movement, because the shutter speed, not the diaphragm aperture, has been increased.

The so-called "rolling shutter" image capturing may be used. In this case, the read timing at the vertical transfer path of the CMOS image sensor 12 is controlled to simultaneously execute charge-reading of continuous images in part at several positions such that timings of the charge-reading of the continuous images neighboring in time are overlapped in part, thereby complete the continuous image capturing of several images within a shorter time.

Subsequently, a dummy still image, which will not be used in the image composition and saving, is captured without flash (Step S110). Subsequently, a still image is captured immediately after the capturing of the dummy still image, while applying light to the object from the flash unit 33 (Step S111) in order to obtain an image of a person who may be in the foreground.

Figure 5:
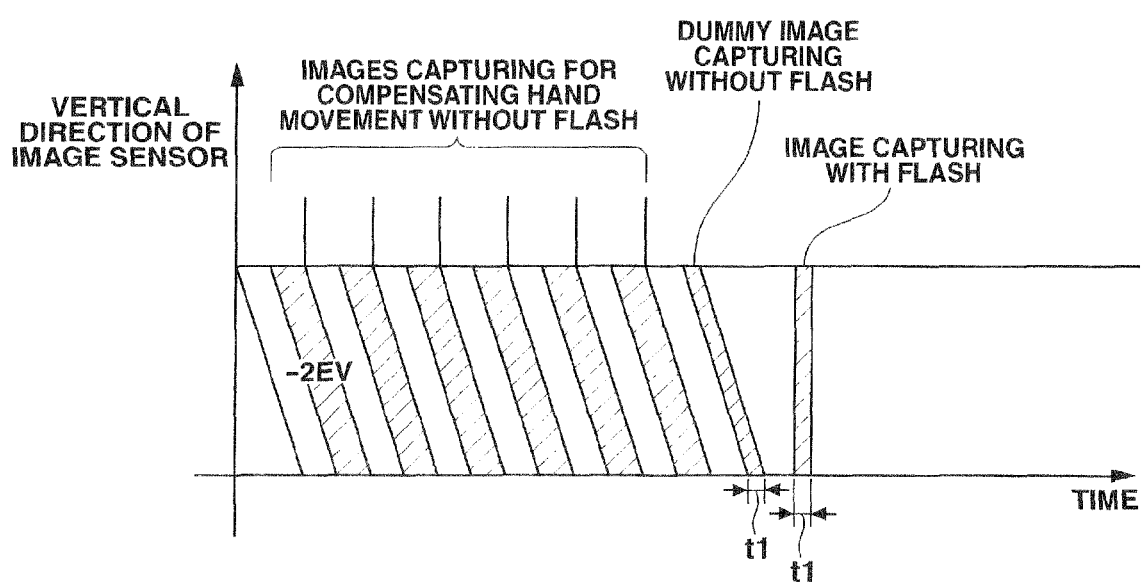
FIG. 5 is a diagram showing the continuous image capturing sequence performed in the embodiment.

FIG. 5 is a diagram showing the image capturing sequence of first capturing six still images without flash, subsequently capturing a dummy still image without flash, and finally capturing a still image with flash. In FIG. 5, image capturing positions with respect to the vertical direction of the CMOS image sensor 12 (i.e., imaging element) are plotted on the Y axis, and time is plotted on the X axis.

As seen from FIG. 5, the six still images are captured without flash, at an exposure value smaller by "2EV" than the appropriate value. Because of non-flash image capturing, the shutter speed is inevitably long.

A dummy still image is captured without flash, at a sufficiently high shutter speed t1 of, e.g., "1/125 [sec]," which is as high as the speed for image capturing with flash.

Subsequently, an image of the object is captured with flash, at the sufficiently high shutter speed t1 of, for example, "1/125 [sec]" with light emission from the flash unit 33.

Thus, eight continuous still images are captured, and the RAW data representing the eight still images are stored in the DRAM 14. Then, the characteristic value calculating unit 15b calculates the white balances (WB) of these still images (Step S112).

Next, the de-mosaic unit 15a performs a dc-mosaic process on the RAW data representing the eight still images, converting the RAW data to YUV data of the luminance-color difference system (Step S113).

Then, the block matching unit 15c performs an operation utilizing a projection transformation matrix using the SRAM 16 based on random sample consensus (RANSAC), in order to perform the position adjustments on the six still images obtained without flash (Step S114).

More precisely, two of the six still images, which are intermediate in time, i.e., the third and fourth still images, are first selected. Of these two still images, the image more adjacent in time to the still image captured with flash, i.e., the fourth still image is selected. Using the fourth still image as a reference, a calculation of the projection transformation matrix between each of the first, second, third, fifth and sixth still images, and the fourth still image as the reference, is executed.

Based on the projection transformation matrix thus calculated, a matrix showing an amount and a direction of the displacements the first, second, third, fifth and sixth still images have with respect to the fourth still image as the reference is calculated as characteristic values.

It is then determined whether or not the displacements the first, second, third, fifth and sixth still images have with respect to the fourth still image as the reference are equal to or smaller than a preset threshold value, thereby determining whether or not the still images captured without flash have been successfully adjusted in position (Step S115).

If it is determined that the displacements the first, second, third, fifth and sixth still images have with respect to the fourth still image as the reference are equal to or smaller than the preset threshold value and a position adjustment of the still images captured without flash have been successfully performed, a position adjustment between the fourth still image as the reference and a still image captured with flash (Step S116).

Figure 4:
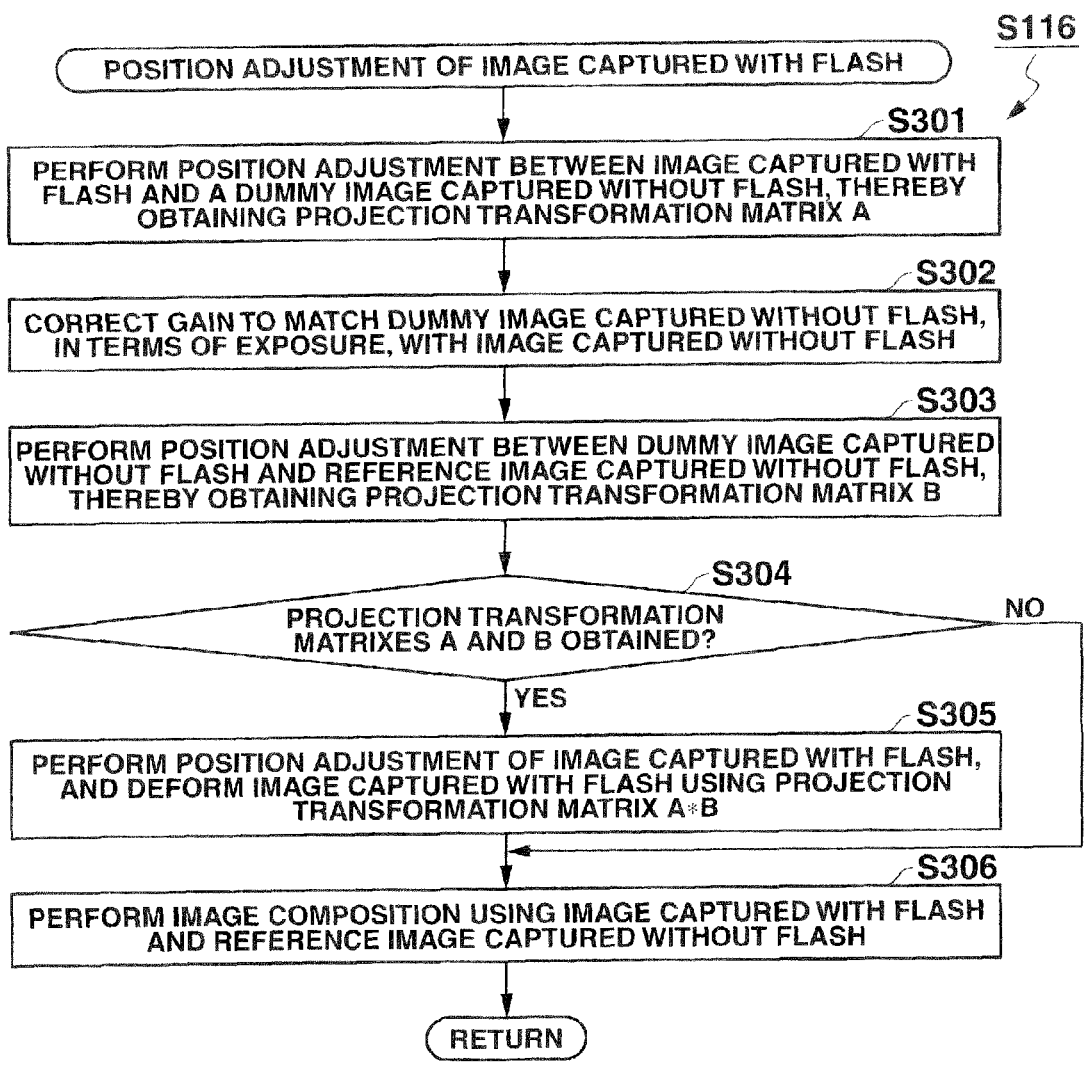
FIG. 4 is a flowchart representing the flash image position adjustment subroutine shown in FIG. 3.

FIG. 4 shows a subroutine explaining, in detail, the process (Step S116) of performing position adjustments on the still images. At first, the eighth still image captured using the flash unit 33 and the seventh still image captured without flash are subjected to a block matching process and the operation utilizing a projection transformation matrix based on RANSAC, both performed in the block matching unit 15c. A projection transformation matrix A representing the displacement between these two still images is thereby obtained (Step S301).

In the eighth still image, the object (person) in the foreground appears bright in part and the background looks very dark. This is because the eighth still image has been captured at a high shutter speed with flash.

On the other hand, the dummy still image captured at high shutter speed without flash is very dark in both the foreground and the background.

Captured at the same shutter speed, these two still images are almost identical in terms of background luminance. Hence, the projection transformation matrix A can be calculated, both easily and reliably.

Next, gain is corrected in order to match the seventh still image captured without flash, in terms of exposure, with the fourth as the reference of the six still images continuously captured without flash (Step S302).

The seventh still image, which is a dummy image, is very dark both in foreground and background, because it has been captured at a high shutter speed without flash.

By contrast, the fourth still image is rather dark as a whole, both in foreground and background. This is because it has been captured at a low shutter speed without flash.

Both the fourth still image and the seventh still image have been captured without flash and have the same luminance change pattern, though differ in luminance because they have been captured at different shutter speeds. Hence, they are, in principle, still images that can have the same luminance if a gain corresponding to the ratio of one image to the other in terms of shutter speed is multiplied by the luminance of the other image.

The seventh still image and the fourth still image as the reference of the six still images captured continuously), both captured without flash with one having undergone gain correction, are subjected to the block matching process and the operation utilizing a projection transformation matrix based on RANSAC, both performed in the block matching unit 15c. A projection transformation matrix B is thereby obtained, which represents the displacement between the seventh and fourth still images (Step S303).

Thereafter, it is determined whether or not the projection transformation matrix A and the projection transformation matrix B have been obtained in Steps 301 and 303, respectively (Step S304).

Only if both projection transformation matrixes A and B are determined to have been obtained, the eighth still image captured using the flash unit 33 is adjusted in position with the fourth (i.e., reference image) of the six still images continuously captured, with respect to a plurality of characteristic points, by utilizing the projection transformation matrixes A and B (Step S305). In this instance, the image captured with flash is deformed and then adjusted in position. Nonetheless, the fourth still image captured without flash may instead be deformed and then adjusted in position. In this case, the characteristic values (i.e., displacements) obtained in Step S114 should be corrected.

Thereafter, an image composition is performed using the still image captured with flash and the fourth still image captured without flash to generate a composite image (Step S306). The subroutine is then terminated, and the operation returns to the process of FIG. 3.

Using the product of the projection transformation matrix, "A*B," the background part of one still image is converted in coordinates by the image deforming/composing unit 15d and is thereby adjusted in position. The displacement the two still images preceding and following the dummy still image, respectively, have with respect to the dummy still image is thereby eliminated. As a result, the person's image in the foreground can be correctly superposed on the background.

If it is determined in Step S304 that at least one of the projection transformation matrixes A and B has not been obtained, the operation jumps to Step S306 to perform the image composition, skipping the process of Step S305. Then, the subroutine of FIG. 4 is terminated, and the operation returns to the process of FIG. 3.

In the process of FIG. 3, after the position adjustment of the still image captured with flash in Step S116, with respect to the obtained composite image, position adjustments on the first, second, third, fifth and sixth still images (i.e., all images continuously captured without flash, except the fourth still image used as a reference) are also performed on the basis of the displacement calculated in Step S114 and an image composition is performed to generate a composite image (Step S117).

In this case, the technique called "high dynamic range (HDR)" image composing technique is applied to the image composition using five still images captured without flash, thereby expanding the dynamic range of the background part. This reduces totally underexposed parts.

Then, the composed still image, or final image, is subjected to data compression according to, for example, the JPEG format, generating an image file. The image file is saved in the memory card 34, i.e., the storage medium incorporated in the digital camera 10 (Step S118). The process of FIG. 3 thus ends, and the operation returns to the process of FIG. 2.

If it is determined in Step S115 that the still images captured without flash have not been successfully adjusted in position because the displacements the first, second, third, fifth and sixth still images have with respect to the fourth still image as the reference are greater than the preset threshold value, the resultant composite image will possibly blur in hand movement or object movement too much. In this case, the image data representing the eighth still image captured with flash is determined as the final image (Step S119).

The operation then goes to Step S118. In Step S118, the still image is subjected to data compression according to the JPEG format, generating a data file. The data file is saved in the memory card 34, i.e., the storage medium incorporated in the digital camera 10. A series of processes is thus completed, and the operation returns to the process of FIG. 2.

As has been described in detail, this embodiment can capture a still image of a person in a night scene, first by capturing a dummy still image not using the flash unit 33, after performing image capturing not using the flash unit 33 and before performing image capturing using the flash unit 33, then by calculating the displacement between each still image and the dummy still image that is intermediate in time and therefore affine to any other image, by using projection transformation matrixes, and finally by performing an image composition using the background image captured not using the flash unit 33 on the basis of the projection transformation matrixes and the image of the person in the foreground captured using the flash unit 33. Hence, the foreground part and the background part can be adjusted in position with a high possibility.

In this embodiment, several still images, e.g., six images are continuously captured without flash as shown in FIG. 5. The present invention is not limited to this configuration. Instead, one still image may be captured without flash at an appropriate exposure, more precisely at a largest diaphragm aperture and a highest shutter speed possible, and a dummy still image may then be captured without flash.

If this is the case, it suffices to perform image capturing three times at most to provide the final image. This reduces the amount of data the image processing unit 15 needs to process, ultimately shortening the time the digital camera 10 needs to provide the final image.

By contrast, if several still images are continuously captured, as described above, without flash at a high shutter speed, they will be less likely to blur in hand movement or object movement. This can not only increase the possibility for successful image synthesis, but also expand the dynamic range of the background part.

In the embodiment described above, several still images are continuously captured without flash, at a shutter speed too high for an appropriate exposure, and one of these still images is used as a reference to perform position adjustments on other similar images and a dummy image captured without flash. This simplifies the process, rendering it easy to determine whether or not the images can be adjusted.

In the embodiment described above, if it is determined that several still images continuously captured without flash have not been adjusted as desired, they are not used at all, and only the still images captured using the flash unit 33 are saved. That is, any image that has a large dark part or will blur in hand movement or object movement too much if used in an image composition, such image is not used in the image composition. Hence, only a still image captured using the flash unit 33 and showing a person in the foreground can be reliably recorded.

In the embodiment described above, if it is determined that the several images continuously captured without flash have been successfully adjusted, the final composite image is obtained by utilizing, for example, projection transformation matrixes based on RANSAC. Thus, the images can be adjusted in position with a high possibility.

Although not explained in conjunction with the embodiment described above, an image composition is performed using the images without being deformed if they are not displaced with respect to one another, or if they are displaced but by values smaller than the preset threshold value. This reduces the amount of data the image processing unit 15 must process and simplifies the process.

Further, in the embodiment described above, an image captured without flash and a dummy image captured without flash are adjusted in position after one of these images has been corrected in gain, thus having the same luminance level as the other image. This increases the accuracy of calculation for the position adjustment, ultimately accomplishing position adjustment of high accuracy.

In the embodiment described above, the images captured without flash are adjusted in position with the image captured with flash, after the images are deformed on the basis of a plurality of characteristic points. Therefore, when an image composition is performed using the images captured at different times, it is possible to provide an image that looks more natural in consideration of the positional changes of the images.

In the embodiment described above, a dummy image is captured without flash after six images have been captured without flash, and another image is captured with flash. Nonetheless, first an image may be captured with flash, then a dummy image may be captured without flash, and finally six images may be captured without flash.

If an image of a person is captured, however, he or she may move after the flash image capturing in most cases. In view of this, the images can be more successfully adjusted in position if images for position adjustment are first captured without flash before any other image is captured with flash as in the embodiment described above. In this case, the dummy image may first be captured without flash and six images may then be captured without flash.

The present invention has been explained as a digital camera. The invention is not limited to a digital camera, nevertheless. Rather, the present invention can be implemented as any electronic apparatus that can perform flash image capturing, such as a mobile telephone terminal, mobile-type personal computer, an electronic book terminal, and a personal digital assistant (PDA).

The present invention is not limited to the embodiments described above. The components of any embodiment can be modified in various manners in reducing the invention to practice, without departing from the sprit or scope of the invention. Further, the components of any embodiment described above may be combined, if necessary, in various ways to make different inventions. For example, the functions of the embodiment described above may be combined in any desired fashion. The embodiment described above includes various phases of the invention. The components disclosed herein may be combined as needed to make various inventions. For example, even if some components of the embodiment described above are not used, the resulting configuration can be considered as the invention so long as it achieves the advantages described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
an image capturing unit configured to capture an image of an object to output image data;
a flash unit configured to apply light to the object when the image capturing unit captures an image of the object;
a holding unit configured to hold the image data output by the image capturing unit;
a first image capturing control unit configured to cause the image capturing unit to capture an image of the object at a predetermined shutter speed, while the flash unit is applying no light;
a second image capturing control unit configured to cause the image capturing unit to capture an image of the object at a shutter speed higher than the predetermined shutter speed, while the flash unit is applying no light;
a third image capturing control unit configured to cause the image capturing unit to capture an image of the object at a shutter speed higher than the predetermined shutter speed, while the flash unit is applying light;
a first position adjusting unit configured to perform a position adjustment between the image data obtained under the control of the first image capturing control unit and held in the holding unit, and the image data obtained under the control of the second image capturing control unit and held in the holding unit, thereby calculating a first displacement;
a second position adjusting unit configured to perform a position adjustment between the image data obtained under the control of the second image capturing control unit and held in the holding unit, and the image data obtained under the control of the third image capturing control unit and held in the holding unit, thereby calculating a second displacement;
an image composing unit configured to obtain image data representing a composite image, by performing a position adjustment between the image data obtained under the control of the first image capturing control unit and held in the holding unit, and the image data obtained under the control of the third image capturing control unit and held in the holding unit, using the first and second displacements; and
a saving unit configured to save, in a medium, the image data obtained by the image composing unit.

2. The image capturing apparatus according to claim 1, further comprising an automatic exposure unit configured to obtain a diaphragm aperture and a shutter speed,
wherein the first image capturing control unit causes the image capturing unit to capture an image of the object at the shutter speed obtained by the automatic exposure unit, while the flash unit is applying no light.

3. The image capturing apparatus according to claim 1, further comprising an automatic exposure unit configured to obtain a diaphragm aperture and a shutter speed,
wherein the first image capturing control unit causes the image capturing unit to capture an image of the object several times at a shutter speed higher than the shutter speed obtained by the automatic exposure unit, while the flash unit is applying no light.

4. The image capturing apparatus according to claim 3, further comprising a third position adjusting unit configured to perform position adjustments, using one of image data items held in the holding unit as a reference, on remaining image data items other than the one of the image data items, wherein the first position adjusting unit performs a position adjustment between the image data used as a reference by the third position adjusting unit and the image data obtained under the control of the second image capturing control unit and held in the holding unit.

5. The image capturing apparatus according to claim 4, wherein:
the third position adjusting unit calculates a third displacement when performing the position adjustment,
the image capturing apparatus further comprises a determining unit configured to determine, from the third displacement, whether or not the first image capturing control unit has achieved image capturing successfully,
the image composing unit stops obtaining the image data representing the composite image when the determining unit determines that the first image capturing control unit has not achieved image capturing successfully, and
the saving unit saves, in the medium, only the image data obtained by the third image capturing unit and held by the holding unit.

6. The image capturing apparatus according to claim 4, wherein:
the third position adjusting unit calculates a third displacement when performing the position adjustment,
the image capturing apparatus comprises a determining unit configured to determine, from the third displacement, whether or not the first image capturing control unit has achieved image capturing successfully, and
the image composing unit obtains image data representing the composite image, by performing a position adjustment using a projection transformation matrix between the image data obtained under the control of the first image capturing control unit and held in the holding unit, and the image data obtained under the control of the third image capturing control unit and held in the holding unit, using the first and second displacements, when the determining unit determines that the first image capturing control unit has achieved image capturing successfully.

7. The image capturing apparatus according to claim 1, wherein when at least one of the first and second displacements is equal to or smaller than a preset threshold value, the image composing unit obtains image data, without performing a position adjustment between the image data obtained under the control of the first image capturing control unit and held in the holding unit, and the image data obtained under the control of the third image capturing control unit and held in the holding unit.

8. The image capturing apparatus according to claim 1, further comprising a gain correcting unit configured to perform gain correction on the image data obtained under the control of the second image capturing control unit and held in the holding unit, on the basis of the image data obtained under the control of the first image capturing control unit and held in the holding unit,
wherein the first position adjusting unit performs a position adjustment between the image data that has undergone the gain correction and the image data obtained under the control of the first image capturing control unit and held in the holding unit, thereby calculating the first displacement.

9. The image capturing apparatus according to claim 1, wherein at least one of the first and second position adjusting units calculates displacements at a plurality of points spaced apart in images, and the image composing unit deforms at least one image such that the displacement is zero at each of the points spaced apart in the images, thereby obtaining image data representing the composite image.

10. An image capturing method for use in an apparatus including an image capturing unit configured to capture an image of an object to output image data, a flash unit configured to apply light to the object when the image capturing unit captures an image of the object, and a holding unit configured to hold the image data output by the image capturing unit, the method comprising:

performing a first image capturing control of causing the image capturing unit to capture an image of the object at a predetermined shutter speed, while the flash unit is applying no light;

performing a second image capturing control of causing the image capturing unit to capture an image of the object at a shutter speed higher than the predetermined shutter speed, while the flash unit is applying no light;

performing a third image capturing control of causing the image capturing unit to capture an image of the object at a shutter speed higher than the predetermined shutter speed, while the flash unit is applying light;

performing a first position adjustment between the image data obtained under the first image capturing control and held in the holding unit, and the image data obtained under the second image capturing control and held in the holding unit, thereby calculating a first displacement;

performing a second position adjustment between the image data obtained under the second image capturing control and held in the holding unit, and the image data obtained under the third image capturing control and held in the holding unit, thereby calculating a second displacement; and performing an image composition of obtaining image data representing a composite image, by performing position adjustment between the image data obtained under the first image capturing control and held in the holding unit, and the image data obtained under the third image capturing control and held in the holding unit, using the first and second displacements.

11. A non-transitory information storage medium storing a program to be executed by a computer in an apparatus including an image capturing unit configured to capture an image of an object to output image data, a flash unit configured to apply light to the object when the image capturing unit captures an image of the object, and a holding unit configured to hold the image data output by the image capturing unit, the program causing a computer to function as units comprising:

a first image capturing control unit configured to cause the image capturing unit to capture an image of the object at a predetermined shutter speed, while the flash unit is applying no light;

a second image capturing control unit configured to cause the image capturing unit to capture an image of the object at a shutter speed higher than the predetermined shutter speed, while the flash unit is applying no light;

a third image capturing control unit configured to cause the image capturing unit to capture an image of the object at a shutter speed higher than the predetermined shutter speed, while the flash unit is applying light;

a first position adjustment unit configured to perform a position adjustment between the image data obtained by the first image capturing control unit and held in the holding unit, and the image data obtained by the second image capturing control unit and held in the holding unit, thereby calculating a first displacement;

a second position adjustment unit configured to perform a position adjustment between the image data obtained by the second image capturing control unit and held in the holding unit, and the image data obtained by the third image capturing control unit and held in the holding unit, thereby calculating a second displacement; and an image composition unit configured to obtain image data representing a composite image, by performing a position adjustment between the image data obtained by the first image capturing control unit and held in the holding unit, and the image data obtained by the third image capturing control unit and held in the holding unit, using the first and second displacements.

* * * * *